Jan. 12, 1926. 1,569,375
E. E. JOSLIN
AUTOMATIC LIQUID CONTROL
Filed May 25, 1925
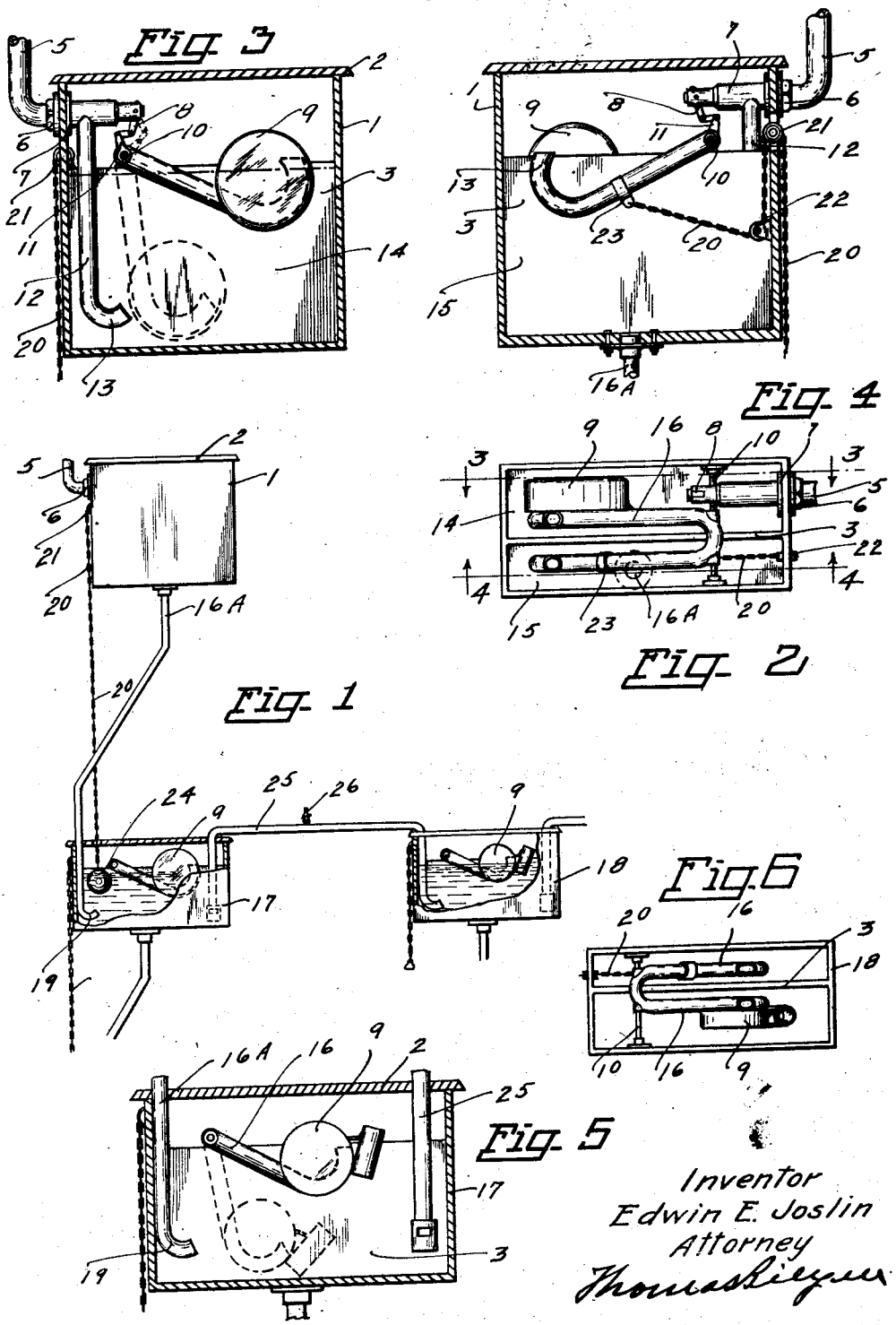
Inventor
Edwin E. Joslin
Attorney
Thomas Sieger Patented Jan. 12, 1926.

1,569,375

UNITED STATES PATENT OFFICE.

EDWIN E. JOSLIN, OF PORTLAND, OREGON.

AUTOMATIC LIQUID CONTROL.

Application filed May 25, 1925. Serial No. 32,704.

*To all whom it may concern:*

Be it known that I, EDWIN E. JOSLIN, a citizen of the United States, residing at Portland, county of Multnomah, and State of Oregon, have invented a new and useful Improvement in an Automatic Liquid Control, of which the following is a specification.

The applicant herein has a pending application of the United States Patent Office, filed March 6, 1923, Serial No. 623,207, for an automatic liquid control.

In this device, as in the pending application, the same is to be used for automatic liquid control, for use in buildings, apartments, hotels, factories and like places where water is to be drawn in volume with a light head pressure at intervals and wherein the same may be refilled again before being used.
Further objects of my present invention consists in a master control box into which liquid, under a substantial head, is discharged therein and having a float control for operating the inlet valve of the liquid to be deposited therein under pressure.

Further novelty resides in the float construction and the operation of the same in the master control box.

Further novelty resides in the shape of the discharged terminal leading from the master control box to a series of one or more of said boxes to be located at levels below that of the master control box.

Further novelty resides in the float discharge control leading from the master control box to that of the series located therebelow.

Further novelty resides in the means adapted to draw flushing water from any one of the lower individual flushing tanks, in the series, and to refill the same from others in the same series.

With these and incidental objects in view, the invention consists in certain novel features of construction and combination of parts, the essential elements of which are set forth in the appended claims and to a preferred form of embodiment of which is hereinafter shown with reference to the drawings which accompany and form a part of this specification.

For a more complete description of my invention, reference is made to the accompanying drawings in which,—
Fig. 1 is a side elevation, partially in section, of the master control box and the series disposed therebelow and illustrates the means supplying the liquid from the master control to the series disposed below the same.

Fig. 2 is a plan view of the master control box.

Fig. 3 is a sectional view taken on line 3—3 of Fig. 2 looking in the direction indicated.

Fig. 4 is a sectional view taken on line 4—4 of Fig. 2 looking in the direction indicated.

Fig. 5 is a sectional view taken on line 5—5 of Fig. 6 looking in the direction indicated.

Fig. 6 is a plan view of one of the series disposed below the master control box.

Like reference characters refer to like parts throughout the several views.

1 is the master control box having a closure 2 disposed thereupon and having a transverse partition 3, the top of which is disposed somewhat above the center line of the control box as shown in Fig. 4. 5 is a pipe leading from the liquid supply to the control box having suitable fastening nuts 6 and 7 to facilitate the passage of the liquid pipe 5 through the wall of the master control box. A suitable valve is disposed in the discharge end of pipe 5 adapted to being manipulated by the lever system 8. A float 9 is hinged about the pivot support 10 and terminating in the crank 11 for maniplating the valve operating lever 8. The drop of the float 9 into the dotted position as shown in Fig. 3 opens the valve and the liquid to be admitted is discharged through pipe 12 terminating in the bend 13 disposed at the lower end of the same and arranged to impinge the discharge liquid upon the float 9. The master control box is divided into compartments 14 and 15. The liquid is discharged from the source of supply into the compartment 14 and is transferred from compartment 14 to compartment 15 through siphon 16. Leading from the compartment 15 is a discharge pipe connecting the master control box with a series of flushing tanks 17 and 18 disposed therebelow. The discharge pipe 16$^A$ terminates in the curved terminal 19 adapted to discharging liquid, at or near the bottom of the flushing tank 17. The normal position of the siphon 16 is shown in the full line position of Fig. 4. Attached to this siphon is a chain pull 20 passing over the pulleys 21 and 22 and connected to the siphon by suitable means as shown at 23. This chain pull terminates on this lower end in a float 24. The float is of sufficient weight, when not buoyed up by the liquid in the tank 17 to force the siphon 16 into the dotted position as shown in Fig. 3, which permits of the discharging of the liquid from compartment 15 into the flushing tank 17, but the buoyancy of the liquid entering the flushing tank 17 raises the float 24 thus permitting the siphon 16 to raise to normal position as shown in Fig. 4; thus when liquid is withdrawn from the flushing tank 17, the float 24 will fall and liquid will be drawn from the master control box 1 to the flushing tank 17, but as soon as the supply has gone to the supplying of the flushing tank 17, the buoyancy of a liquid therein will raise the float and cut off the liquid to be discharged through the pipe 16.

Connecting the flushing tanks 17 and 18 is an inverted siphon 25 which maintains the equilibrium level in the flushing tanks 17 and 18. To facilitate the filling of the inverted siphon, or the drawing of air therefrom, the cock 26 is provided at the highest point in the inverted siphon 25.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claim which follows.

What I claim is:—

An automatic liquid control, comprising a master control box having an inlet compartment and a discharging compartment formed by a transverse partition disposed thereacross, the upper surface of which is disposed substantially below the upper, outer surfaces of the outer walls of the box, the receiving compartment of said master control box being connected to a source of liquid under pressure, a float controlled valve admitting liquid from said source when the level of said liquid is lowered in the inlet compartment of said box, an inlet pipe having its inner end disposed below the inlet valve and being curved upwardly and so disposed as to impinge the discharging liquids upon the float contained therein to impart an upward movement thereto, a yoke siphon disposed over the transverse partition and adapted to pass liquids from the inlet compartment within the box to the outlet compartment of said box, said siphon adapted to be oscillated about a fixed bearing within the box and to actuate the float controlled valve to admit liquid within the inlet compartment within the box, a series of one or more secondary flushing tanks disposed below the master control box and a communicating flushing pipe disposed between the master control box and the first of the series of flushing tanks disposed therebelow, and float control means adapted to manipulate the outlet means disposed within the outlet compartment of the master control box.

EDWIN E. JOSLIN.